(12) United States Patent
Tork et al.

(10) Patent No.: US 7,033,523 B2
(45) Date of Patent: Apr. 25, 2006

(54) COMPOSITE LIQUID CRYSTALLINE MIXTURE

(75) Inventors: Amir Tork, Cap Rouge (CA); Dany Dumont, Quebec (CA); Tigran Galstian, Ste-Foy (CA); Armen Zohrabyan, Quebec (CA); Rouslan Birabassov, Quebec (CA)

(73) Assignee: Photintech Inc., Quebec (CA)

( * ) Notice: Subject to any disclaimer, the term of this patent is extended or adjusted under 35 U.S.C. 154(b) by 0 days.

(21) Appl. No.: 10/713,785

(22) Filed: Nov. 14, 2003

(65) Prior Publication Data
US 2005/0104036 A1 May 19, 2005

(51) Int. Cl.
*C09K 19/52* (2006.01)
*C09K 19/54* (2006.01)

(52) U.S. Cl. .............................. 252/299.01; 252/299.1; 252/299.5

(58) Field of Classification Search ................. 428/1.1, 428/1.3; 252/299.01, 299.5, 299.1; 385/126
See application file for complete search history.

(56) References Cited

U.S. PATENT DOCUMENTS

| | | | |
|---|---|---|---|
| 5,190,688 A | 3/1993 | Sage et al. | |
| 5,963,291 A | 10/1999 | Wu et al. | |
| 6,285,812 B1 | 9/2001 | Amundson et al. | |
| 6,452,573 B1 * | 9/2002 | Martinot-Lagarde et al. | .. 345/8 |
| 2003/0103708 A1 | 6/2003 | Galstian et al. | |

* cited by examiner

Primary Examiner—Shean C. Wu
(74) Attorney, Agent, or Firm—Darby & Darby

(57) ABSTRACT

Described is a composite liquid crystalline mixture having a low refractive index and a chemical reactive power that makes it capable of minimizing an anchoring energy when in contact with silica. This mixture comprises:

(a) low ordinary refractive index nematic liquid crystal of a single type or a mixture of low ordinary refractive index nematic liquid crystals of different types;

(b) at least one reagent compound capable of reducing the anchoring energy via a chemical shielding process and from which originates a decoupling effect with a glass interface leading to the reduction of the anchoring energy and appropriately orienting a liquid crystal director at this interface; and (c) at least one low refractive index additive having a relatively low viscosity.

The above mixture is useful in waveguide tuning applications.

16 Claims, 7 Drawing Sheets

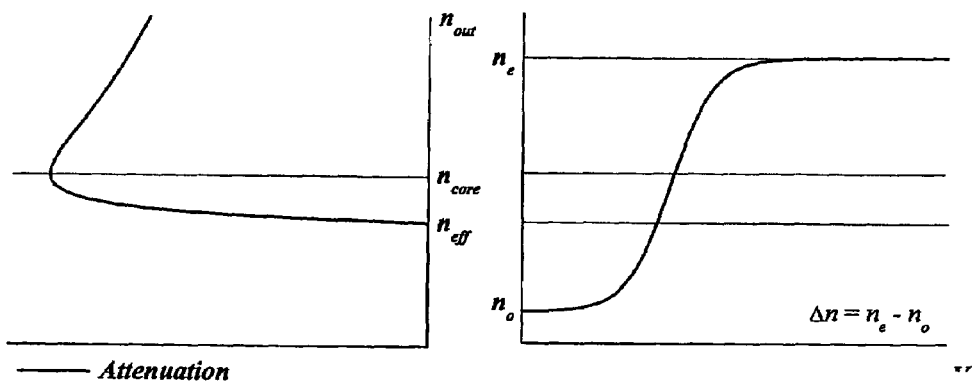
FIG. 3a
FIG. 3b
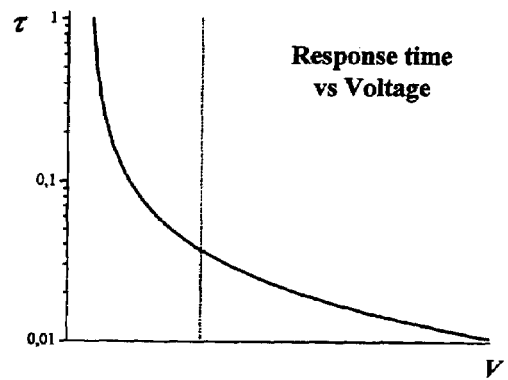
FIG. 3c

Examples of nematic liquid crystal types

| Type | Example |
|---|---|
| Cyclohexyl carboxylic acid (CHCA) |  |
| Bicyclohexyl (CCH) |  |
| Phenyl cyclohexyl (PCH) |  |
| Biphenyl (B) |  |
| Biphenyl cyclohexyl (BCH) |  |
| Terphenyl (T) |  |
| Ester (ME) |  |
| Phenyl cyclohexyl carboxylate (D) |  |
| Bicyclohexy ester cyclohexyl (CH) |  |

COMPOSITE LIQUID CRYSTALLINE MIXTURE

FIELD OF THE INVENTION

The present invention relates to a composite liquid crystalline (LC) mixture having a low refractive index and a chemical reactive power that makes it capable of minimizing the anchoring energy when in contact with silica, adapted to waveguide tuning applications.

More specifically, the invention relates to a composite liquid crystalline mixture which basically comprises a low ordinary refractive index nematic liquid crystal of a single type or a mixture of different types of nematic liquid crystals, at least one reagent compound, and at least one low refractive index additive.

BACKGROUND OF THE INVENTION

The energy budget control in optical telecommunication networks is a key issue to reduce the implementation cost, optimize the performance and decrease the number of components and the size of systems used. For example, an optical telecommunication line needs more optical amplifiers if the losses are too high. It is therefore very important to choose optical components (e.g. variable optical attenuator (VOA), add/drop filter, etc.) with minimal losses when they are used in their transparent state.

Traditionally, telecommunication signal processing components are built using well-known techniques of semiconductor, mechanical or micro mechanical industries that are usually well adapted for free-space applications, where light is brought out from the fiber. However, it is well known that when the light is coupled out of a fiber to be transformed (filtered, attenuated, dropped, dispersion compensated, etc.) then there are always higher losses than if the light remains in the original communication fiber. Presently, among the efforts made to improve the effectiveness of the network, in-guide tuning of optical properties (light remains in the original waveguide while being transformed) appears to be a more suited solution for the fabrication of low loss optical components. The main underlying principle here is the use of the evanescent part of the signal to affect it dynamically.

The material issue appears to be inherently involved in this development process since it must provide media that is able to dynamically alter the optical properties of the guiding component. Composite organic materials, including polymers, liquid crystals, oils, surfactants, etc., are good candidates to address this paramount problem. This class of materials often provides low-cost fabrication techniques and is easy to manipulate in comparison with complex and costly operations needed to fabricate inorganic semiconductor components (vacuum deposition, very high curing temperature, fragile solid crystal growth, etc.).

Among the most interesting organic materials, liquid crystal materials and/or mixtures have demonstrated high reliability, excellent performance and cost-effectiveness in display technologies. Presently, LCs are considered as promising materials for the development of intelligent (i.e., dynamically reconfigurable) optical telecommunication networks. For example, LC displays (LCD's), which consist of a LC planar cell capable of changing the polarization state of light, may be used as a part of variable optical attenuators, optical switches, optical routers, tunable filters and polarization control devices. This technology is taking the advantages of the huge technical knowledge and know-how developed in the mature LCD industry. However, the LC devices used always remain in the free space geometry where the light is travelling in the direction perpendicular to the cell substrates. This fact requires that the light must be out-coupled from the waveguide, propagating in free space (through electrodes, etc.) and consequently suffering losses.

In addition, such micro LCD's do not provide an appropriate solution in terms of compact integration. By way of reference, U.S. Pat. No. 5,963,291 (Wu et al.) granted on Oct. 5th, 1999 describes an optical attenuator in which a LC cell acts as a voltage controlled polarization transformer. This polarization modulation is in turn transformed into an intensity modulation using appropriate static birefringent elements. In this invention, light first comes out of the fiber, passes through optical elements and returns into the output fiber, thereby featuring the mentioned above free space modulation mode.

Using LCs in waveguiding geometries seems to be a better way to combine the advantages of the LC (low cost, low loss and power consumption, strong electro-optic effect, short response time, high reliability, etc.) and the specific needs of integration (miniaturization, heatless operation, etc.). U.S. Pat. No. 6,285,812 (Amundson et al.) granted on Sep. 4th, 2001 describes a device where the light is guided in a special optical fiber having a LC core surrounded by a glass cladding. Light propagation properties are altered using appropriate electrode assembly and corresponding electric field geometry to periodically change the effective refractive index of the core material creating a tunable grating-like structure in the waveguide. The light remains in the fiber and the losses arise mainly from the index profile perturbations of the modified optical fiber. In this particular case however, additional losses may arise from linear and nonlinear scattering (since the greatest part of the mode is propagating in the LC medium), from polarization dependant losses (PDL) or from a mode profile and index mismatch with the next communication element (e.g., a standard SMF-28 fiber) in which the device is integrated. Thus, the splicing losses and nonlinearities along with the exotism of the fiber used and its cost are among numerous drawbacks of this solution. However, this idea demonstrates an application where LCs are used to control an optical signal in a guided regime.

Problems associated with the use of LCs in guided geometries, such as electro-optic cladding elements (see FIG. 1 identified as "Prior Art"), reside when the guiding surfaces/interfaces cannot be treated with conventional methods for example those employed in the LCD industry, such as ionic deposition, polymer mechanical rubbing or anisotropic UV curing, etc. to fix preferred orientation of LC director at these surfaces. As an example to demonstrate the difficult adaptation of standard techniques to special geometries is the problem of reduced diameter cylindrical waveguides (e.g. etched or tapered optical fibers) with an overall diameter typically at the order of 1 to 10 µm. The relative fragility of these structures makes it impossible to use standard LC aligning techniques (especially mentioned above contact methods). In contrast, planar waveguides are better adapted to conventional aligning methods, but are not easily adaptable to communication networks using optical fibers. It is worth mentioning that it is one of the objects of the present invention to overcome this problem.

LC materials that are synthesized to optimize the performance of traditional LCD's mainly address parameters like the birefringence $\Delta n$, defined by the difference of the extraordinary and ordinary refractive indices of the material $n_e - n_o$, the dielectric anisotropy $\Delta \epsilon$, the viscosity $\gamma$, the elastic constants $K_i$ and the nematic temperature range $\Delta T_N$.

At the same time, for the guided-mode modulation applications, the LC material may be close to wave guiding boundaries, which may not be treatable with the same processes as for the LCD's. For example, United States laid-open patent application No 2003/0103708-A1 (Galstian et al.) published on Jun. 5th, 2003, describes a tunable waveguide where the LC is employed as an electro-controllable cladding of a cylindrical waveguide (fiber), confined in a planar cell geometry or in a cylindrical capillary. This application is represented in FIG. 1. The waveguide (fiber) is assembled in a cell, which is filled with the electro-optic material.

Preferably, the waveguide employed in U.S. patent application laid-open No 2003/0103708 A1 (Galstian et al.) is a commercially available optical fiber (e.g. SMF-28 or UV sensitive fibers) where the refractive indices involved are higher than the refractive indices of organic compounds forming LC mesophases. Also, in order to interact with the guided mode, the LC cladding must be close enough to the waveguide core, leading to an overall waveguide size of a few micrometers, typically. This may be achieved by etching, polishing or otherwise removing a part of the fiber or by fiber tapering. Deposition of a polymer film at the surface of this structure and its rubbing may not be appropriate to align LCs in the preferred direction without damaging the waveguide. Additionally, the polymer would become an important element of the guiding structure and its physical and optical properties (thickness, uniformity of the layer, refractive index, absorption, scattering, homogeneity, etc.) would become hardly controllable parameters. This is also a paramount issue for all other known surface treatment processes because of the very small size, special form of the waveguide (cylindrical geometry, etc.) and its fragility. Thus, the use of LC in guided mode modulation geometries requires alternative materials and aligning techniques.

U.S. Pat. No. 5,190,688 (Sage et al.) granted on Mar. 2nd, 1993 describe a means of reducing the refractive index of a liquid crystal mixture that facilitates the formulation of mixtures for use in a wider range of devices such as liquid crystal displays operating in an NCAP (Nematic Curvilinear Aligned Phase) mode and tunable planar or fiber optical waveguide applications. In the latter case, it is therefore assumed that the preferred geometry used is still a planar configuration which dictates that tunable optical fiber devices only enclose side-polished fibers often called half-couplers. Other configurations are not specifically addressed because of the tricky problem of the LC anchoring. Planar devices may be treated using well-known methods borrowed from the LCD technology. However, in the particular case of LC-based tunable optical waveguides, the authors of this U.S. Pat. No. 5,190,688 do not discuss the key issue of the anchoring while it remains a non-evident problem even in planar geometries because any surface treatment should affect the waveguide optical properties (e.g. a polymer film coated as an overlay layer on a planar lightwave circuit should become a part of the optical modelling of the device).

Optical propagation in waveguide devices has another key difference with respect to LCD's: light propagates along the waveguide axis and not through the thickness of the LCD cell. The light propagation length in LC is thus much longer in the guided mode (3 to 4 orders of magnitude) than in the LCD's. Hence, the major material synthesis challenges here would be the adjustment of the absolute ordinary refractive index value and the LC-to-waveguide anchoring properties. As described in the United States patent application No U.S. 2003/0103708 A1 (Galstian et al.), the refractive index of the outer electro-controllable cladding must be tuned near to the effective refractive index of the waveguide to obtain phase and/or amplitude modulation. The amount of the phase shift or attenuation of the signal depends directly on the interaction length (the part of the fiber where light interacts with the electro-controllable cladding) that is typically in the range of millimeters to centimeters. However, the difference, δ, between the core and cladding refractive indices $n_{core} - n_{cladding}$ is usually very small, being in the order of $10^{-3}$. On the other hand, LC materials may have a birefringence value as high as Δn=0.3, and the minimum value obtainable among commercially available mixtures is around Δn=0.035 (FIG. 2). To avoid the difficulties of fine tuning (variation of the external controlling field amplitude required to induce a corresponding refractive index variation) of the optical propagation properties of the device, it is desirable to have a LC with $\Delta n = n_e - n_o$ comparable but greater than δ, and it is also desirable to have an ordinary refractive index $n_o$, which is lower than the refractive index of the waveguide cladding (e.g. fused silica). Indeed, FIG. 3 describes the general working principle of the in-guide phase tuning or signal attenuation in the particular case of the electro-optic liquid crystal materials where, in particular, the response time (the time required to reorient the molecules from the elastic equilibrium to the prescribed orientation) depends on the applied electric field.

It is known that there is certain relation between the birefringence and the absolute refractive index of nematic LC materials. Such relationships are represented in FIG. 2. The graph is a collection of experimental values (Δn, $n_e$) for commercially available nematic LC mixtures as well as pure nematic compounds. It indicates a strong correlation between the quantities Δn and $n_e$. The values are measured at a visible wavelength (λ=589 nm) and mainly at room temperature (20° C.) where the mixtures exhibit a nematic mesophase. One can easily see that low refractive index corresponds to low birefringence, in perfect agreement with the guided mode modulation requirements. As mentioned above, tunable waveguides made of silica (such as standard optical fibers) require an external medium having a minimum refractive index (which is the ordinary refractive index $n_o$ in the case of positive birefringence LC materials) that is near and preferably lower than the refractive index of the silica glass in the desired spectral band. Usually, the dispersion of the transparent organic materials forming LC mixtures is comparable to that of silica and the relative difference between their refractive indices at a visible wavelength may be reported to the near infrared spectral area. The limit curve displayed in FIG. 2 indicates the boundary between LC compounds that satisfy or not this condition. Only a few existing mixtures are suited for the specific task of tuning silica waveguides' guiding properties (wavelength selectivity, phase, amplitude, polarization, etc.) but some of their key properties are not adapted for that application.

The media available from the prior art do not allow the required advantages to be achieved simultaneously. To summarize, the composite liquid crystalline mixture must simultaneously comply with the following requirements:

the nematic range, which defines the main operation condition, must preferably comprise a well-defined temperature interval (e.g. between −10 to +70° C.);

the optical properties of the mixture must be adjusted to have at least one of the refractive indices below the refractive index of the silica;

the anchoring energy of the mixture at the silica waveguide surface must be negligible so the director could align along the desired direction by means of geometrical elastic energy potential and external control fields;.

the anchoring properties at other aligning interfaces, such as rubbed polymer should remain reliable; and the mixture has to be chemically and thermally stable, and must not degrade when submitted to electromagnetic radiation.

In view of the above, it is obvious that there is a need for a specifically designed electro-controllable material.

SUMMARY OF THE INVENTION

Thus, it is an object of the present invention to address the above problems by providing a composite liquid crystalline mixture having a low refractive index and a chemical reactive power that makes it capable of minimizing an anchoring energy when in contact with silica, said mixture comprising:

(a) low ordinary refractive index nematic liquid crystal of a single type or a mixture of low ordinary refractive index nematic liquid crystals of different types;

(b) at least one reagent compound capable of reducing the anchoring energy via a chemical shielding process and from which originates a decoupling effect with a glass interface leading to the reduction of the anchoring energy and appropriately orienting a liquid crystal director at this interface; and (c) at least one low refractive index additive capable of modifying dielectric anisotropy, conductivity and viscosity of the mixture, said at least one low refractive index having a low viscosity and a refractive index that is lower than the ordinary refractive index of the liquid crystalline mixture so as to decrease and adjust the ordinary refractive index of said mixture value below the refractive index of silica.

The composite liquid crystal mixture according to the invention is particularly interesting in that it is capable of reacting with glass surfaces. It is also capable of lowering the intermolecular binding energy between mesogenic LC material and silica, thereby providing the predominance of external and geometrical factors in the determination of the easy axis (LC director orientation) at the surface of planar or cylindrical guiding structures such as optical fibers. In addition, the composite liquid crystalline mixture of the present invention has a low birefringence value (see FIG. 2) and an ordinary refractive index that is lower than the refractive index of the fused silica, in order to comply with waveguide tuning applications.

Advantageously, the at least one reagent compound (b) is present in an appropriate ratio ranging approximately from 0.1 to 10%. It's purpose is essentially to reduce the anchoring energy via a chemical shielding process of the waveguide surface.

The chemical shielding of the glass surface by at least one reagent compound results into the significant reduction of the anchoring energy that is mainly attributed to the various chemical bonds of the LC molecules with interfaces (see FIG. 4). The determination of the preferred molecular orientation at the interface is then guaranteed by external factors; e.g., the geometry of the surface. In the particular case of an optical fiber interface (see FIG. 5), the distortion energy of the director field has a minimum value when the LC molecules are aligned along the z-axis (see FIG. 6a), defined by the waveguide axis, where there is no distortion. There is a continuum of zero distortion energy states, but it is the only one where the orientation of the molecules with respect to the interface is homogenous around the waveguide. The value of the potential well is proportional to K ln(L/R) where L is the radius of the entire volume (in a concentric geometry), R is the radius of the cylindrical optical waveguide (optical fiber) and K is the elastic constant of the LC. When R is sufficiently small (typically 5 μm), the elastic distortion energy density of the perpendicular (FIG. 6b) or circular (FIG. 6c) configuration become significant in comparison with the anisotropic anchoring potential induced by molecular interactions. If the molecular contribution to the anisotropic anchoring of the LC molecules at the interface is less than the contribution of geometrical factors, the latter one will predominate in the anchoring process. The overall anchoring strength remains however relatively weak compared to cases when traditional methods (such as polymer rubbing) are used at cell substrates containing the fiber and LC. The so-called coherence length is then reduced, thus decreasing the response time but enhancing the refractive index change in the close proximity of the fiber, where the surface interactions are significantly reduced.

Other aspects and advantages of the present invention will be apparent upon reading the following non-restrictive description of several preferred embodiments, made with reference to the accompanying drawings.

BRIEF DESCRIPTION OF THE DRAWINGS

FIGS. 3a to 3c are graphical representations of the optical properties of an optical fiber linked with the electro-optical properties of composite liquid crystalline mixtures. More precisely, FIG. 3a is a graph schematically representing the attenuation as a function of the outer cladding refractive index of an optical fiber. FIG. 3b is a graph representing the variation of birefringence as a function of the electric field of an optical fiber. FIG. 3c is a graph representing the response time (the time required to reorient the molecules from the elastic equilibrium to the prescribed orientation) as a function of the applied electric field.

(FIG. 5a) electro-optic liquid crystal mixture without reagent compound—a high pre-tilt angle is observed at the surface of the fiber; (FIG. 5b) an electro-optic cell filled with a mixture containing 5% of the at least one reagent compound—a good planar alignment being observed along the direction of the fiber axis; and (FIG. 5c) the same electro-optic cell observed with a polarizing microscope (25×) without polarizers—one may compare the fiber diameter with the structures observed in the two previous microphotographs.

(FIG. 6a) parallel alignment (along the waveguide axis); (FIG. 6b) perpendicular alignment (parallel to the waveguide radius); and (FIG. 6c) circular alignment (tangential to the waveguide surface and perpendicular to the waveguide axis).

DETAILED DESCRIPTION OF PREFERRED EMBODIMENTS OF THE INVENTION

As aforesaid the present invention is directed to a composite liquid crystalline mixture having a low refractive index and a chemical reactive power that makes it capable of minimizing an anchoring energy when in contact with silica. This mixture comprises:

(a) low ordinary refractive index nematic liquid crystal of a single type or a mixture of low ordinary refractive index nematic liquid crystals of different types;

(b) at least one reagent compound capable of reducing the anchoring energy via a chemical shielding process and from which originates a decoupling effect with a glass interface leading to the reduction of the anchoring energy and appropriately orienting a liquid crystal director at this interface; and (c) at least one low refractive index additive having a relatively low viscosity.

The low ordinary reference index nematic liquid crystals used as component (a) can be selected from a considerably wide range of nematic liquid crystals.

Figure 7:
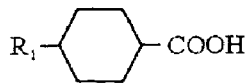
FIG. 7 is a table listing various examples of nematic liquid crystals.
Figure 7:
Figure 7:
Figure 7:
Figure 7:
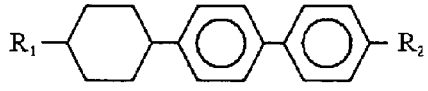
Figure 7:
Figure 7:
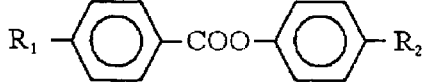
Figure 7:
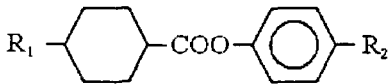
Figure 7:
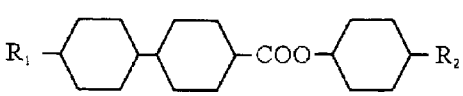

Examples of such nematic liquid crystals include, but are not limited to the substances listed in the Table enclosed in FIG. 7 and their derivatives. Of course, nematic liquid crystals of different types to be mixed to form a mixture must be selected so to be readily miscible with one another so as to form a chemically and thermally stable mixture and provide for a widened nematic temperature range in comparison to individual compounds.

Preferably, the liquid crystal mixture is selected so as to have a positive or a negative dielectric anisotropy ($\Delta\epsilon$), and a nematic temperature range ($\Delta T_N$) comprising a wide temperature interval. For example, in order to properly operate a device between −5° C. and 65° C., it is necessary that the nematic range is preserved over a wider interval for example, from −10° C. to 70° C.

The at least one reagent compound used as component (b) can be selected from the group consisting of organic silanes, siloxane copolymers, and polysiloxane polymers, and mixtures thereof.

The organic silane can be represented by formula I:

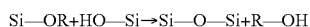

$$R_n\text{—Si—}X_{(4-n)} \quad (I)$$

wherein

R is an organic non-functional group, such as an alkyl, which must not react with the mixture of low ordinary refractive index nematic liquid crystals that is previously described, X is a functional group selected from group consisting of OH, OCO, OCONH$_2$, OCONH, OCON, CN, SCN, OR, OCONHR, COOR, —CH=CH—, an epoxy group, and OSi(CH$_3$)$_2$OSiH(CH$_3$)$_2$), said functional group being capable of reacting with an organic or inorganic material so as to form an optical waveguide surface by means of hydrogen bonds and/or covalent bonds, and n is 0,1,2 or 3

As aforementioned, the at least one reagent compound used as component (b) can also be a siloxane copolymer or a polysiloxane polymer. An example of such a siloxane copolymer is a diphenyl dimethyl siloxane copolymer and/or a poly(dimethylsiloxane-co-alkylmethylsiloxane). A preferred polysiloxane polymer of the present invention is polysiloxane polyether, poly(methylhydrosiloxane) or poly(methyl(3,3,3-trifluoropropyl)siloxane).

Advantageously, the at least one reagent compound used as component (b) is selected so as to be readily miscible in the liquid crystalline mixture. As aforesaid, the basic function of the at least one reagent used as component (b) is to form chemical bonds with a silica glass surface. For this purpose, the at least one reagent (b) should exhibit a chemical reactivity with the glass surface, a negligible chemical reactivity with the compounds forming the described solution and a negligible reactivity with materials (often organic) forming the aligning layer in electro-optic cells.

In another preferred embodiment of the present invention, the at least one reagent compound (b) may optionally contain a Si—O—Si bond (e.g. siloxane derivatives), in order to maximize the chemical reactivity between the at least one reagent compound (b) and the silanol group (Si—OH) of the silica.

Figure 4A:
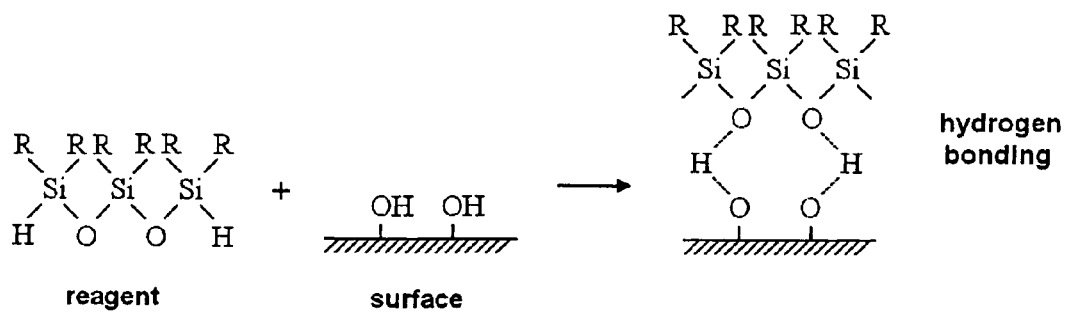
FIGS. 4a and 4b are representations of the surface chemical bonding of (FIG. 4a) general reagent compound as defined in the present invention, and (FIG. 4b) two types of chemical bonding that may occur between the glass surface and the at least one reagent compound.
Figure 4B:
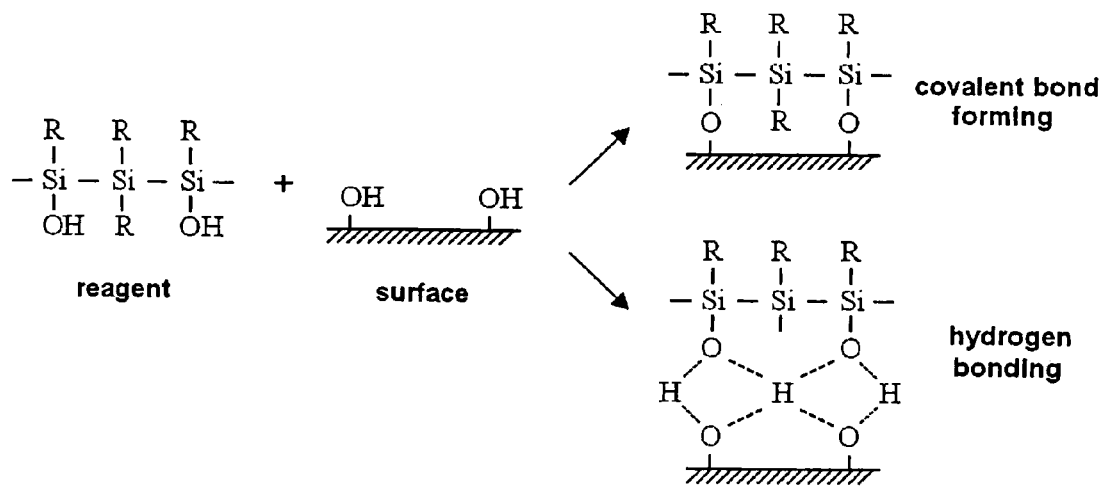

As shown in FIGS. 4a and 4b, a covalent bond formation or hydrogen bonding can occur between two molecules having functional groups. For example, by using 1,1,3,3,5,5-hexamethyltrisiloxane as choice of reagent compound (b) in a composite liquid crystalline mixture prepared in accordance with the present invention, the chemical bonding of the LC molecules with the silica glass surface is shielded and the anchoring energy between LC molecules and the glass surface is decreased. An example of the corresponding chemical reaction is described by the following equation:

Si—OR+HO—Si→Si—O—Si+R—OH

Basically, an alkoxysilane molecule reacts on a glass surface and forms a siloxane bond (Si—O—Si). Due to the strong proton donor and acceptor role of the Si—OH group, the molecular interaction between alkoxysilanes and silanol is higher than with the liquid-crystal molecules. The molecules attached on the glass surface, having non-functional remaining groups such as alkyl groups, have virtually no interactions with each other or with the LC molecules of the mixture.

Optionally, the composite liquid crystal mixture of the present invention may further comprise at least one low refractive index additive (c) that is selected to be readily miscible in the other components of the mixture. Preferably, the at least one additive used as component (c) has a refractive index that is lower than the ordinary refractive index of the mixture to decrease and adjust the ordinary refractive index value below the refractive index of the waveguide cladding, usually made of silica ($n_o=n_g=1.4584$ at $\lambda=589$ nm) while keeping a chemically and thermally stable nematic state within a prescribed operating temperature range.

Thus, the composite liquid crystalline mixture prepared according to the present invention can be modified by suitable additives such that they can be used in all types of electro-optic devices disclosed to date. Such additives are known to a person skilled in the art and are widely described in the literature. For example, it is possible to add dichroic dyes, molecules that can affect the dielectric anisotropy, conductivity, viscosity, and the mesogenic phase or the orientation of the director field.

The composite liquid crystalline mixtures according to the present invention are prepared in a manner which is customary per se. As a rule, each of the above-mentioned components of the mixture are mixed in one another, advantageously at elevated temperature.

The following examples are illustrative of the wide range of applicability of the present invention and are not intended to limit its scope. Modifications and variations can be made therein without depending from the spirit and scope of the invention. Although any method and material whether similar or equivalent to those described herein can be used in the practice for testing the present invention, the preferred methods and materials as described.

All of the percentages given hereinabove and below are percentages by weight.

EXAMPLES

Example 1

Table 1 below gives the composition of two LC mixtures (A) and (B) of positive dielectric anisotropy (at both low and optical frequencies) with an optical ordinary refractive index no that is lower than the refractive index of the fused silica. In this composition, the host mixture forming the main constituent is a mixture of low ordinary refractive index nematic liquid crystals called 18523 (commercially available from E. Merck, Darmstadt), which has a positive dielectric anisotropy containing highly fluorinated low refractive index organic compound additives and hydrocarbon LC compounds as described in U.S. Pat. No. 5,190,688; *Jpn. J. Appl. Phys.*, 34, pp. 6410–6415 (1995) (Pan et al.); and *Electron. Lett.*, 23, pp. 1192–1193 (1987) (Sage et al.). As shown in the following Table 1, organic compounds are added to that host to obtain the final specific composition:

TABLE 1

Composition of mixtures A and B

|  | Mixture A | Mixture B |
|---|---|---|
| 18523 | 70% | 73% |
| trans-4-pentylcyclohexane carboxylic acid | 18% | 20% |
| 1,1,3,3,5,5-hexamethyltrisiloxane | 5% | 0% |
| 1,1,1,3,3,3-hexafluoro-2-propanol | 7% | 7% |

Example 2

Table 2 below gives the composition of two LC mixtures (C) and (D) of negative dielectric anisotropy (at low frequency) with an optical ordinary refractive index no that is lower than the refractive index of the fused silica. In this composition, the initial host mixture is a LC mixture of negative dielectric anisotropy containing CCH, CCN, CH and BCN types of LC compounds as described in U.S. Pat. No. 6,027,665. This mixture called ZLI-2806 is commercially available from E. Merck, Darmstadt (ZLI-2806). As in the previous example, the organic compounds are added to the host to obtain the final specific composition:

TABLE 2

Composition of mixtures C and D

|  | Mixture C | Mixture D |
|---|---|---|
| ZLI-2806 | 86% | 92% |
| 1,1,1,3,3,3-hexafluoro-2-propanol | 10% | 5% |
| 1,1,3,3,5,5-hexamethyltrisiloxane | 4% | 3% |

Example 3

Table 3 below gives the composition of two LC mixtures (E) and (F) of positive dielectric anisotropy (at both low and optical frequencies) with an optical ordinary refractive index $n_o$ that is lower than the refractive index of the fused silica. In this composition, the host mixture forming the principal constituent is a LC mixture with positive dielectric anisotropy, containing cyclohexylcarboxylic acid and phenylcyclohexyl types of mesogens. The composition also contains organic compounds that are added to the host to obtain the final specific composition:

TABLE 3

Composition of mixtures E and F

|  | Mixture E | Mixture F |
|---|---|---|
| trans-4-butylcyclohexane carboxylic acid | 28% | 28% |
| trans-4-pentylcyclohexane carboxylic acid | 10% | 13% |
| trans-4-hexylcyclohexane carboxylic acid | 28% | 28% |
| 4-pentylcyclohexyl bifluoromethoxyphenyl | 24% | 24% |
| 1,1,3,3,5,5-hexamethyltrisiloxane | 5% | 5% |
| 1,1,1,3,3,3-hexafluoro-2-propanol | 5% | 2% |

Utility of the Invention

As aforementioned, the composite liquid crystalline mixture according to the invention can be used in optical waveguide tuning applications. The composite liquid crystalline mixture of the invention has a low refractive index as compared to silica, a low surface interaction energy with silica, a broad thermal range of mesogenic phase and a positive or negative dielectric anisotropy at low frequency. All of these properties enable the composite liquid crystalline mixture of the present invention to easily align liquid crystalline molecules and corresponding electro-optic applications with guiding optical devices made of silica, such as fibers, planar or arrayed waveguides.

The composite liquid crystalline mixture of the invention is also well adapted for fabricating an optical signal phase and amplitude modulation device made of silica optical fibers and/or waveguides via the influence of an external electric, magnetic, thermal, acoustic or electromagnetic signal.

Figure 1:
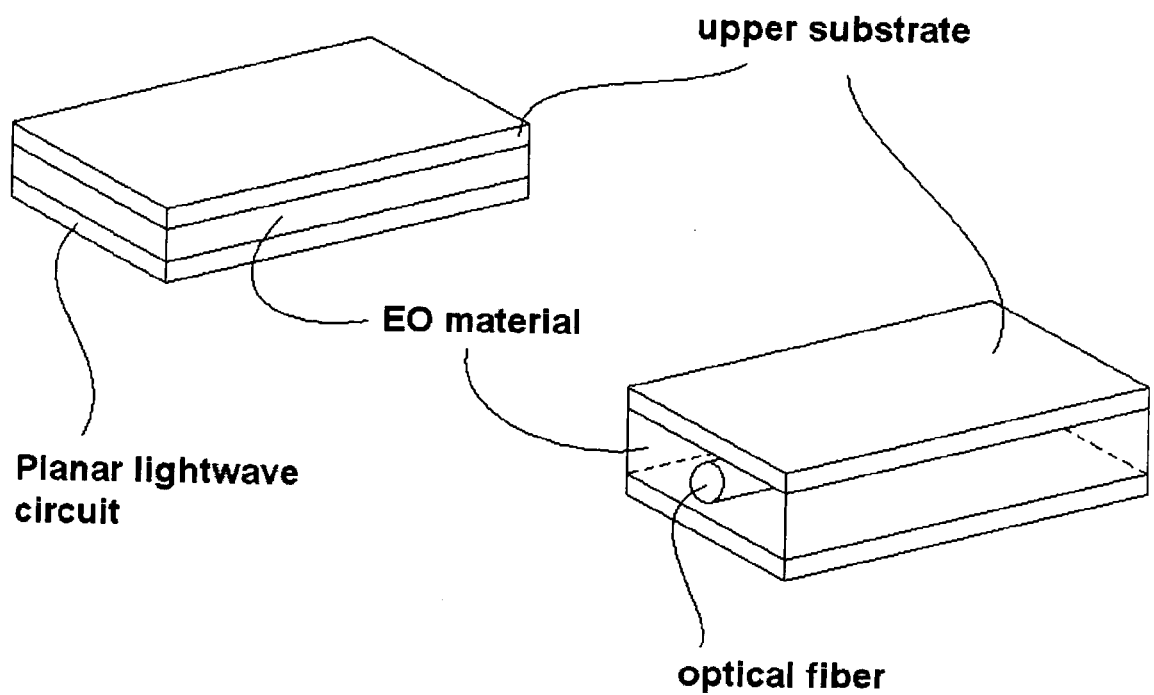
FIG. 1 identified as "prior art" is a schematic representation of a wave-guide capable of modulating optical signals (planar or cylindrical).
Figure 2:
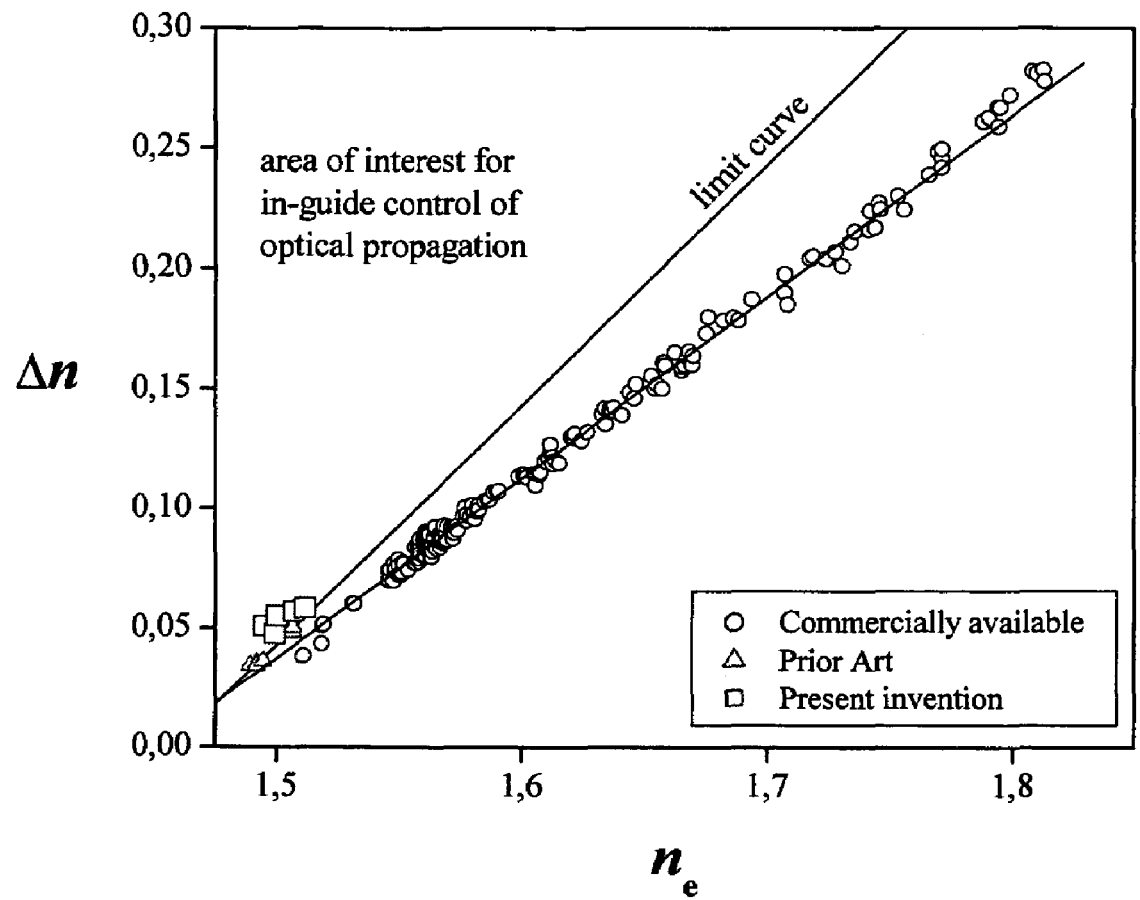
FIG. 2 is a graphical representation showing the empirical relation between the birefringence and the absolute refractive index of nematic liquid-crystal mixtures.

It is worth mentioning that the present invention is also dedicated to the use of composite liquid crystalline mixtures in guided geometries, such as electro-optic cladding elements (see FIG. 1, identified as "Prior Art"). In fact, it is particularly useful when the guiding surfaces/interfaces cannot be treated with conventional methods for example those employed in the LCD industry, such as ionic deposition, polymer mechanical rubbing or anisotropic UV curing, etc. to fix preferred orientation of LC director at these surfaces. As an example to demonstrate the difficult adaptation of standard techniques to special geometries is the problem of reduced diameter cylindrical waveguides (e.g. etched or tapered optical fibers) with an overall diameter typically at the order of 1 to 10 µm. The relative fragility of these structures makes impossible the use of standard LC aligning techniques (especially mentioned above contact methods). In contrast, planar waveguides are better adapted to conventional aligning methods, but are not easily adaptable to communication networks using optical fibers.

The composite liquid crystalline mixture of the present invention (also referred to as an electro-optic material) can, also be used in porous structures such as photonic crystals, band gap systems, and porous glass structures, etc. A more detailed description of applications using such a mixture can be found in the scientific publication entitled *Phys. Rev. Lett.* 83, p. 967 to 970. (1999) (Busch et al.), It is worth mentioning that the composite liquid crystalline mixture of the present invention may also apply to various optical fibers including standard single mode fibers (e.g. SMF-28), multi-mode fibers, or any kinds of special optical glass fiber.

The proposed approach and the composite liquid crystalline mixture of the present invention may successfully be used in display technologies, in particular, in geometries where different orientations (including the ground state) are obtained using external fields instead of surface orientation. An example of such application is the dual frequency display.

Finally, the composite liquid crystalline mixture of the present invention may be used also as an additional cladding layer without reducing the original cladding to modulate the cladding modes' propagation properties (with tapered and fused fibers or other static elements, which transform the core mode to cladding modes, etc.).

Sample Preparation

The composite liquid crystalline mixture described herewith was injected into an electro-optic cell made with two substrates separated by spacers that define the thickness of the cell (see FIG. 1). This cell contained an optical fiber of reduced cladding diameter which was centered with respect to the substrates. In order to obtain a planar homogeneous alignment, the substrate surfaces were coated with a suitable polymer and rubbed in the direction of the fiber axis.

Figure 5A:
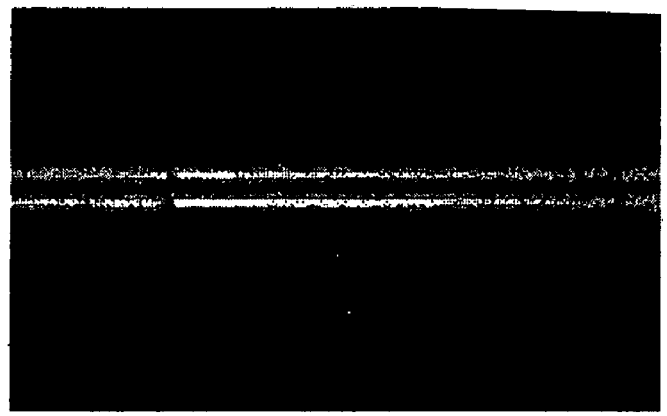
FIGS. 5a to 5c are microphotographs representing an optical fiber with reduced diameter in an electro-optic cell with LC observed with a polarizing microscope (25×) between crossed polarizers.
Figure 5B:
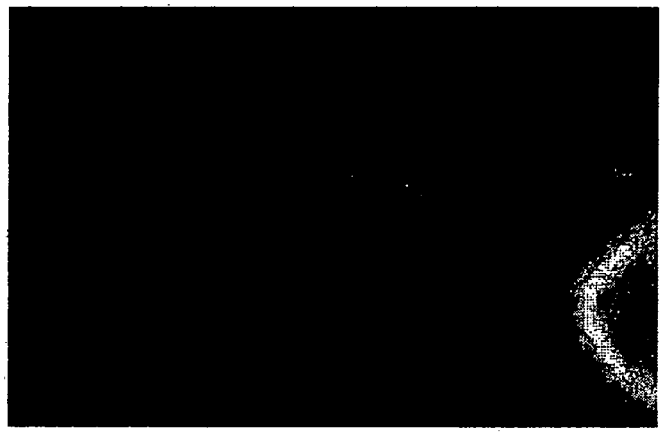
Figure 5C:
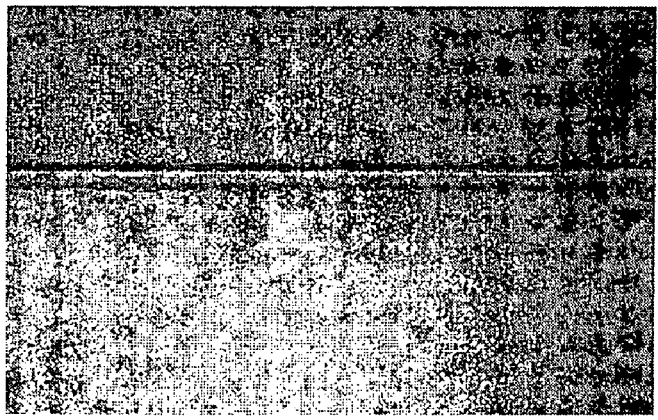
Figure 6A:
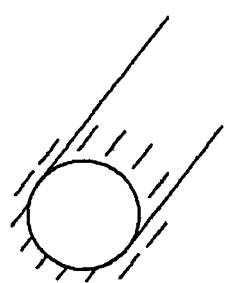
FIGS. 6a to 6c are representations of different liquid-crystal alignment types.
Figure 6B:
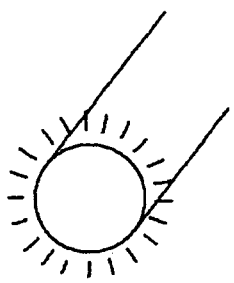
Figure 6C:
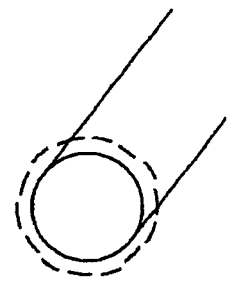

The mixture A and B were injected in separated but identical electro-optic cells. Both mixtures have an ordinary refractive index lower than that of the fiber cladding but only one cell (the one containing the mixture A) can sustain optical propagation because of the parallel LC alignment. The light propagating in the optical fiber fixed in the cell containing the mixture B was leaking out because of the high extraordinary refractive index and the improper LC alignment in the proximity of the fiber. The difference between the two cells can be appreciated by making reference to FIG. 5. When the mixture A is injected, the chemical bonding of the reagent with the fiber surface takes place and the alignment of the LC molecules along the waveguide axis occurs. In making reference to FIG. 5a, one can see that there is a significant pre-tilt angle of the LC molecules in the vicinity of the fiber in the absence of the reagent compound (mixture B). When reagent compound is added to the mixture (mixture A), the pre-tilt angle vanishes (see FIG. 5b) and the LC molecules align along the waveguide axis, minimizing thus the insertion losses of the waveguide.

DSC Analysis of Phase Transition Temperature Ranges

Differential scanning calorimetry (DSC) was used to detect the phase transitions of the proposed liquid crystalline mixtures (crystal-nematic/$T_{CN}$ and nematic-isotropic/$T_{NI}$) and measure the temperature at which they occur. Heating scan was employed to determine the transition sequence. A Perkin Elmer DSC-7 was used with heating scans of 10° C./min. An average of 8 mg of LC compounds according to the present invention was packed into a standard aluminum crucible with an empty crucible being used as a reference. Before each experiment, the temperature was held at 500° C. for 10 minutes in order to clean the DSC head and a background scan was obtained.

TABLE 4

The transition temperatures for different mixtures

| | $T_{CN}$ (° C.) | $T_{NI}$ (° C.) |
|---|---|---|
| Mixture A | −24 | 63 |
| Mixture B | −30 | 68 |

While several embodiments of the invention have been described, it will be understood that the present invention is capable of further modifications, and this application is intended to cover any variations, uses, or adaptations of the invention, following in general the principles of the invention and including such departures from the present disclosures as to come within knowledge or customary practice in the art to which the invention pertains, and as may be applied to the essential features hereinbefore set forth and falling within the scope of the invention or the limits of the appended claims.

The invention claimed is:

1. A composite liquid crystalline mixture having a low refractive index and a chemical reactive power that makes it capable of minimizing an anchoring energy when in contact with silica, said mixture comprising:
   (a) low ordinary refractive index nematic liquid crystal of a single type or a mixture of low ordinary refractive index nematic liquid crystals of different types;
   (b) at least one reagent compound capable of reducing the anchoring energy via a chemical shielding process and from which originates a decoupling effect with a glass interface leading to the reduction of the anchoring energy and appropriately orienting a liquid crystal director at this interface; and
   (c) at least one low refractive index additive capable of modifying dielectric anisotropy, conductivity and viscosity of the mixture, and having a low viscosity and a refractive index that is lower than the ordinary refractive index of the liquid crystalline mixture so as to decrease and adjust the ordinary refractive index of said mixture below the refractive index of silica.

2. The composite liquid crystalline mixture according to claim 1, wherein component (a) consists of a mixture of nematic liquid crystals of different types that are selected to be readily miscible with each other so as to form a chemically and thermally stable mixture and provide a widened nematic temperature range in comparison to liquid crystals of single type.

3. The composite liquid crystalline mixture according to claim 2, wherein the mixture of nematic liquid crystals has a positive or negative dielectric anisotropy.

4. The composite liquid crystalline mixture according to claim 3, wherein the mixture of nematic liquid crystals has a nematic range near to the temperature interval range of −10° C. to 70° C.

5. The composite liquid crystalline mixture according to claim 1, wherein the nematic liquid crystals used as component (a) are selected from the group consisting of cyclohexyl carboxylic acid, bicyclohexyl, phenyl cyclohexyl, biphenyl, biphenyl cyclohexyl, terphenyl, ester, phenyl cyclohexyl carboxylate, bicyclohexy ester cyclohexyl, diester, Schiff, cyclohexyl cyclohexanoate, biphenyl ester, biphenyl cyclohexycarboxylate, thioester, CCN and BCN.

6. The composite liquid crystalline mixture according to claim 1, wherein the at least one reagent compound, used as component (b) is selected from the group consisting of organic silanes, siloxane copolymers, polysiloxane polymers and mixtures thereof, said reagent compound being readily miscible in the liquid crystalline mixture.

7. The composite liquid crystalline mixture according to claim 6, wherein said at least one reagent compound (b) is an organic silane of formula I:

$$R_n—Si—X_{(4-n)} \qquad (I)$$

wherein R is an organic non-functional group that cannot react with said component (a), X is a functional group selected from group comprising —OH, —OCO—, —OCONH$_2$, —OCONH—, —OCON—, —CN, —SCN, —OR, —OCONHR, —COOR, —CH═CH—, an epoxy group, and —OSi(CH$_3$)$_2$OSiH(CH$_3$)$_2$, said functional group being capable of reacting with an organic or inorganic material so as to form an optical waveguide surface by means of hydrogen bonds and/or covalent bonds, and n=0, 1,2,3.

8. The composite liquid crystalline mixture according to claim 7, wherein the organic non-functional group is an alkyl.

9. The composite liquid crystalline mixture according to claim 6, wherein the at least one reagent compound (b) is a diphenyl dimethyl siloxane copolymer.

10. The composite liquid crystalline mixture according to claim 6, wherein the at least one reagent compound (b) is a polysiloxane polyether.

11. The composite liquid crystalline mixture according to claim 1, wherein the at least one reagent compound (b) further comprises a Si—O—Si bond so as to maximize its reactivity with a silanol group (SiOH) of the silica.

12. The composite liquid crystalline mixture according to claim 1, wherein the at least one reagent compound (b) is present in a ratio from 0.1 to 10% by weight of said composite liquid crystalline mixture.

13. The composite liquid crystalline mixture according to claim 1, wherein the at least one additive used as component (c) is selected to be readily miscible in said liquid crystalline mixture.

14. The composite liquid crystalline mixture according to claim 13, characterized in that the at least one additive (c) is a dichroic dye.

15. The composite liquid crystalline mixture according to claim 1, wherein said mixture has a birefringence value that is comparable or greater than the difference between core and cladding refractive index of an optical wave guide.

16. A composite liquid crystalline mixture having a low refractive index and a chemical reactive power that makes it capable of minimizing an anchoring energy when in contact with silica, said mixture comprising:
   (a) low ordinary refractive index nematic liquid crystal of a single type or a mixture of low ordinary refractive index nematic liquid crystals of different types;
   (b) at least one reagent compound capable of reducing the anchoring energy via a chemical shielding process and from which originates a decoupling effect with a glass interface leading to the reduction of the anchoring energy and appropriately orienting a liquid crystal director at this interface; and
   (c) at least one low refractive index additive having a low viscosity and a refractive index that is lower than the ordinary refractive index of the liquid crystalline mixture so as to decrease and adjust the ordinary refractive index of said mixture below the refractive index of silica.

* * * * *